May 16, 1950          G. A. LACOUT          2,507,571
VEGETABLE CHOPPER
Filed Sept. 25, 1946          2 Sheets-Sheet 1
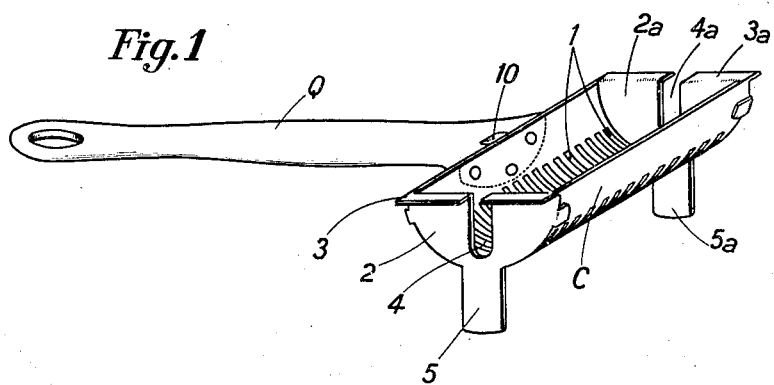
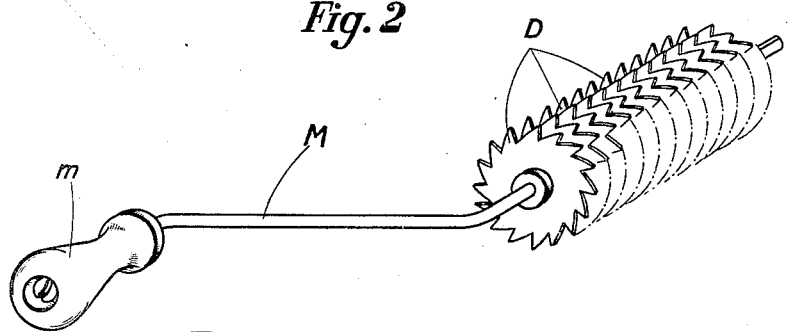
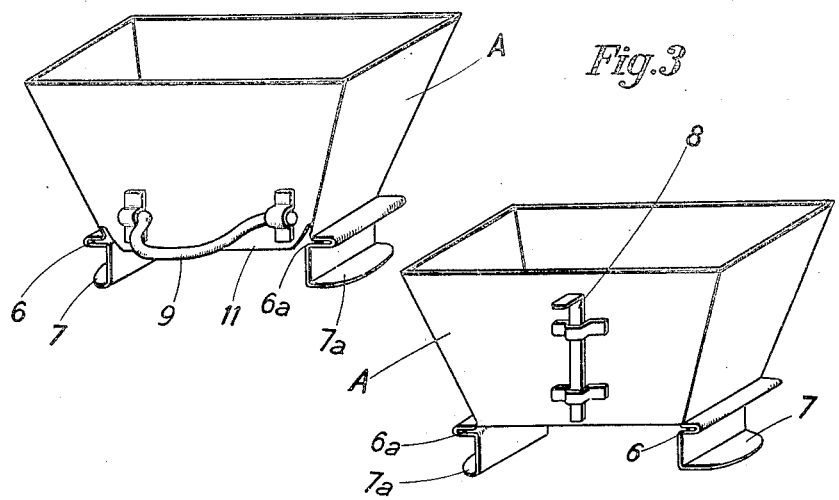

May 16, 1950 — G. A. LACOUT — 2,507,571
VEGETABLE CHOPPER
Filed Sept. 25, 1946 — 2 Sheets-Sheet 2

Inventor
Georges Auguste Lacout

Patented May 16, 1950

2,507,571

UNITED STATES PATENT OFFICE 2,507,571

VEGETABLE CHOPPER

Georges Auguste Lacout, Paris, France, assignor to Societe Civile d'Etudes pour la Fabrication de Produits Industriels Manufactures (S. E. P. I. M.), Paris, France, a corporate body of France Application September 25, 1946, Serial No. 699,223
In France October 12, 1945

2 Claims. (Cl. 146—123)

The present invention has for its object a household disc chopping machine for edible herbs, and in particular for parsley, chervil, chives, mint, garlic and shallot.

Said chopping machine is characterised by the fact that it comprises, on the one hand a magazine shaped like a hopper, intended to receive the herbs to be chopped, on the other hand a cage having a foraminous bottom forming a comb and located below the magazine and, finally, a plurality of discs provided with teeth and carried by a right angle crank shaft which is eccentrically housed inside the cage in such a manner as to make the teeth project at least completely from the comb.

According to another characteristic of the invention, the teeth of the discs are constructed in such a manner as to form a feed in the normal direction of rotation of the shaft.

Figure 5:
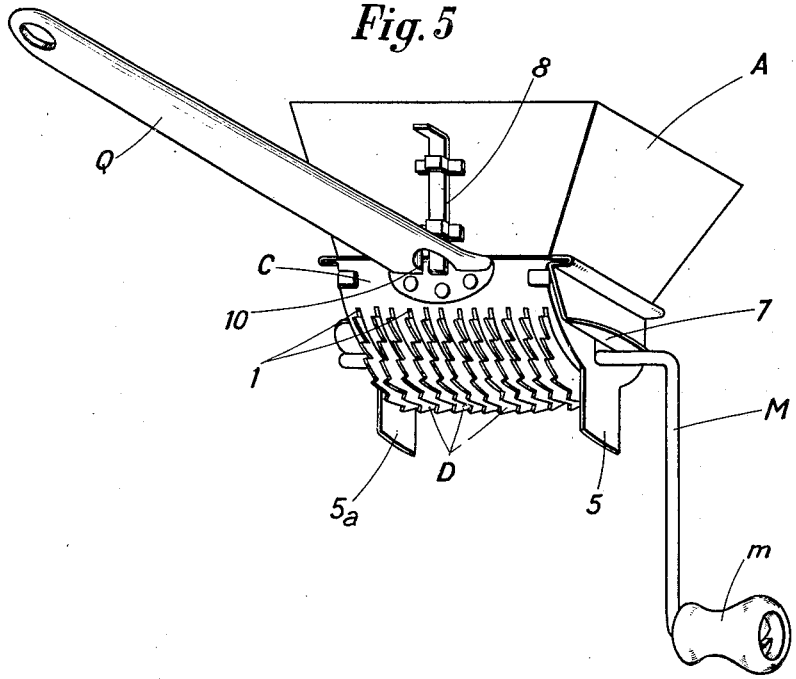
Figure 6:
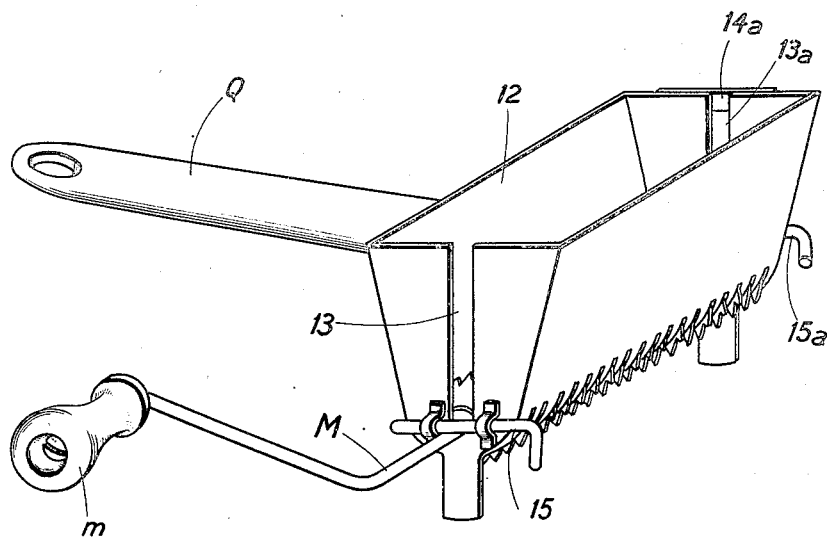

Some embodiments of the invention are illustrated by way of examples in the accompanying drawing in which:

Figs. 1, 2 and 3 and 4 show respectively in perspective the cage, the crank shaft carrying the toothed discs and the removable magazine shown on both its faces, of a household chopping machine shown in Fig. 5; and Fig. 6 is a perspective view showing a variant of a household chopping machine according to the invention.

The household disc chopping machine shown in perspective in Fig. 5 essentially comprises a cage C (Fig. 1) secured to a handle Q, a crank shaft M (Fig. 2) secured to a plurality of discs D at right angles to the shaft and a magazine A (Figs. 3 and 4).

The cage C (Fig. 1) is shaped like a gutter, of semi-circular cross-section in the example, the bottom of which has a plurality of openings 1 at right angles to the axis of the gutter and equidistant. The sides 2, 2a of said gutter are turned over at right angles at 3, 3a and provided, in the plane of symmetry, with an elongated aperture 4, 4a, the circular bottom of which extends beyond the axis of the gutter. The sides 2, 2a of the gutter are furthermore provided with feet forming extensions 5, 5a.

On the crankshaft M (Fig. 2), which carries a handle m, are fixed a plurality of parallel toothed discs D which are flanked at either end by a smooth edged disk of a diameter in excess of the diameter of said toothed disks. The teeth of said discs are arranged so as to form a feed in the normal direction of rotation of the shaft.

The discs may be secured to the crank by any suitable known method and in particular by giving to the crank shaft and to the corresponding opening of the discs a non-circular cross-section which effects the drive, for example flat, square, etc.

The crank shaft M, provided with toothed discs, is fitted on to the cage in such a manner that both ends of the shaft rest against the bottom of the apertures, 4, 4a. In this position, the lower part of the discs projects through the openings 1 a height at least equal to that of the teeth, as can be seen in Fig. 5.

The magazine A (Figs. 3 and 4) is shaped in the example like a frustum of a pyramid, the two lateral sides of which are folded on themselves at 6 and 6a so as to form a guideway, then turned over outwardly at their ends at 7, 7a. The front face of the magazine A is provided with a pivoting handle 9 and the rear face with a sliding bolt 8.

Assembling is effected by engaging the guideways 6, 6a of the magazine which has been turned in the suitable direction on the right angle flanges 3, 3a of the cage; when the magazine has been pushed right home, the bolt 8 is lowered as shown in Fig. 5 and passes through an opening 10 provided in the handle Q, thereby locking the magazine on the cage. A lower extension 11 of the front wall of the magazine (Fig. 4) abuts against the edge of the cage and holds the whole arrangement stationary. In this position, the two right angle edges 7, 7a of the side walls of the magazine press against the shaft M and hold it at the bottom of the apertures 4, 4a.

Fig. 6 shows a variant of construction in which the magazine and the cage are made in one piece comprising a comparatively deep trough 12 secured to the handle Q. Two openings 13, 13a, located in the plane of symmetry and one of which, 13a, may optionally be closed at 14a, enable the shaft M carrying the toothed dics to be inserted. Said shaft is held at the bottom of the slots by means of sliding bolts 15, 15a.

The disc chopping machine which has just been described operates in a particularly simple manner:

The edible plants are introduced into the magazine and are fed forwards by the teeth of the discs, to which is imparted either a continuous rotary motion, or a reciprocating motion. Each disc performs the function of a knife, the counterpart of which is formed by the edge of the corresponding opening of the comb.

This apparatus makes it possible to obtain very quickly and without any fatigue, a grinding which is finer as the discs are placed closer together. Owing to its lightness, it enables the food contained in the dishes to be sprinkled directly without having to pass it through an intermediate container, thus retaining all the aroma of the culinary plants used.

I claim:

1. In a chopping device for vegetable matter and the like of the type provided with a plurality of rotary cutters, the combination of a shallow trough-like receptacle having an open top and a plurality of parallel slots in its bottom; oppositely disposed bearing recesses formed in the side walls of said receptacle and extending from the said open top down to points short of the bottom of the receptacle; a shaft for supporting and operating the rotary cutters, the said shaft being adapted to be received in said bearing recesses for rotation therein and being adapted to be moved into and out of position through said open top; means associated with said shaft for rotating the same; means for locking said shaft in its operative position; a pair of runners forming horizontal flanges provided at the upper end of said receptacle; a hopper having an open top and bottom and slides forming lateral extensions slidably interlocking with said runners for slidably securing the hopper to said receptacle; and spaced bottom supports for said receptacle whereby the device may be placed across pieces of food to be sprinkled with the comminuted material.

2. In a chopping device for vegetable matter and the like of the type provided with a plurality of rotary cutters, the combination of a shallow trough-like receptacle having an open top and a plurality of parallel slots in its bottom; oppositely disposed bearing recesses formed in the side walls of said receptacle and extending from the said open top down to points short of the bottom of the receptacle; a crank shaft for supporting and operating the rotary cutters, the said shaft being adapted to be received in said bearing recesses for rotation therein and being adapted to be moved into and out of position through said open top; a handle for rotating said crank shaft; a pair of runners forming horizontal flanges provided at the upper end of said receptacle; a hopper having an open top and bottom; a set of slides forming lateral extensions disposed at said hopper and adapted to cooperate with said runners for securing the hopper to said receptacle; means for locking said hopper against horizontal movements on said slides; a second set of extensions projecting from said hopper below the plane of its bottom and adapted to bear against said shaft and to lock it in operative position; and spaced bottom supports for said receptacle, whereby the device may be placed against pieces of food to be sprinkled with the comminuted material.

GEORGES AUGUSTE LACOUT.

REFERENCES CITED

The following references are of record in the file of this patent:

UNITED STATES PATENTS

| Number | Name | Date |
|---|---|---|
| 52,199 | Price | Jan. 23, 1866 |
| 425,472 | Turnbull | Apr. 15, 1890 |
| 483,251 | Hartman | Sept. 27, 1892 |
| 713,270 | Wynkoop | Nov. 11, 1902 |
| 739,836 | Cremer | Sept. 29, 1903 |
| 932,745 | Adelsperger | Aug. 31, 1909 |
| 2,001,075 | Sundstrand | May 14, 1935 |
| 2,029,701 | Burditt | Feb. 4, 1936 |
| 2,259,015 | Anderson et al. | Oct. 14, 1941 |
| 2,280,211 | Bernhardt | Apr. 21, 1942 |

FOREIGN PATENTS

| Number | Country | Date |
|---|---|---|
| 69,076 | Germany | June 8, 1893 |
| 483,123 | Germany | Sept. 26, 1929 |
| 126,170 | Austria | Jan. 11, 1932 |
| 509,957 | Great Britain | July 25, 1939 |